United States Patent [19]

Lichtman et al.

[11] Patent Number: 5,020,891

[45] Date of Patent: Jun. 4, 1991

[54] SINGLE APERTURE CONFOCAL SCANNING BIOMICROSCOPE AND KIT FOR CONVERTING SINGLE LAMP BIOMICROSCOPE THERETO

[75] Inventors: Jeffrey W. Lichtman, St. Louis; Jay S. Pepose, Town & Country; Rakhal Dave, St. Louis, all of Mo.

[73] Assignee: Washington University, St. Louis, Mo.

[21] Appl. No.: 446,312

[22] Filed: Dec. 5, 1989

Related U.S. Application Data

[63] Continuation-in-part of Ser. No. 243,353, Sep. 14, 1988, Pat. No. 4,884,880, and Ser. No. 243,354, Sep. 14, 1988, Pat. No. 4,884,881.

[51] Int. Cl.⁵ .................. G02B 21/06; G02B 21/00; G02B 26/02
[52] U.S. Cl. .................. 350/527; 350/507; 350/523; 350/274
[58] Field of Search ............... 350/62, 319, 507, 523, 350/524, 526, 527, 528, 266, 272, 273, 275, 450, 442, 520; 356/152; 351/205, 207, 214

[56] References Cited

U.S. PATENT DOCUMENTS

| | | | |
|---|---|---|---|
| 3,664,751 | 5/1972 | Haas | 350/511 |
| 3,926,500 | 12/1975 | Frosch et al. | 350/274 |
| 4,062,623 | 12/1977 | Suzuki et al. | 350/236 |
| 4,198,571 | 4/1980 | Sheppard | 250/216 |
| 4,215,934 | 8/1980 | Karasawa et al. | 350/442 |
| 4,323,299 | 4/1982 | Roberts | 350/523 |
| 4,359,282 | 11/1982 | Garrison | 350/507 |

FOREIGN PATENT DOCUMENTS

3040378 5/1981 Fed. Rep. of Germany ...... 351/205

Primary Examiner—Bruce Y. Arnold
Assistant Examiner—James Phan
Attorney, Agent, or Firm—Rogers, Howell & Haferkamp

[57] ABSTRACT

A single aperture confocal scanning biomicroscope is disclosed with an illumination system having a pair of lenses surrounding an aperture for collimating a field of light, a pivotally mounted flap for blocking a central portion of the light in order to create peripheral illumination, and an aperture assembly comprised of a cylindrical lens, aperture, and beam splitter which is oscillated within the light field in order to create an aperture size optical beam for scanning a patient's eye and ocular adnexae. With the illumination system of the present invention, techniques involving both direct illumination and indirect illumination may be utilized in examining the eye to produce a true confocal image thereof. Single aperture confocal scanning techniques may be brought to existing slit lamp biomicroscopes with a kit comprised simply of a pair of lenses and an aperture in one embodiment which utilizes the existing illumination system. In a second embodiment, a completely new illumination system is also utilized which provides for examination techniques utilizing both direct and indirect illumination.

49 Claims, 2 Drawing Sheets

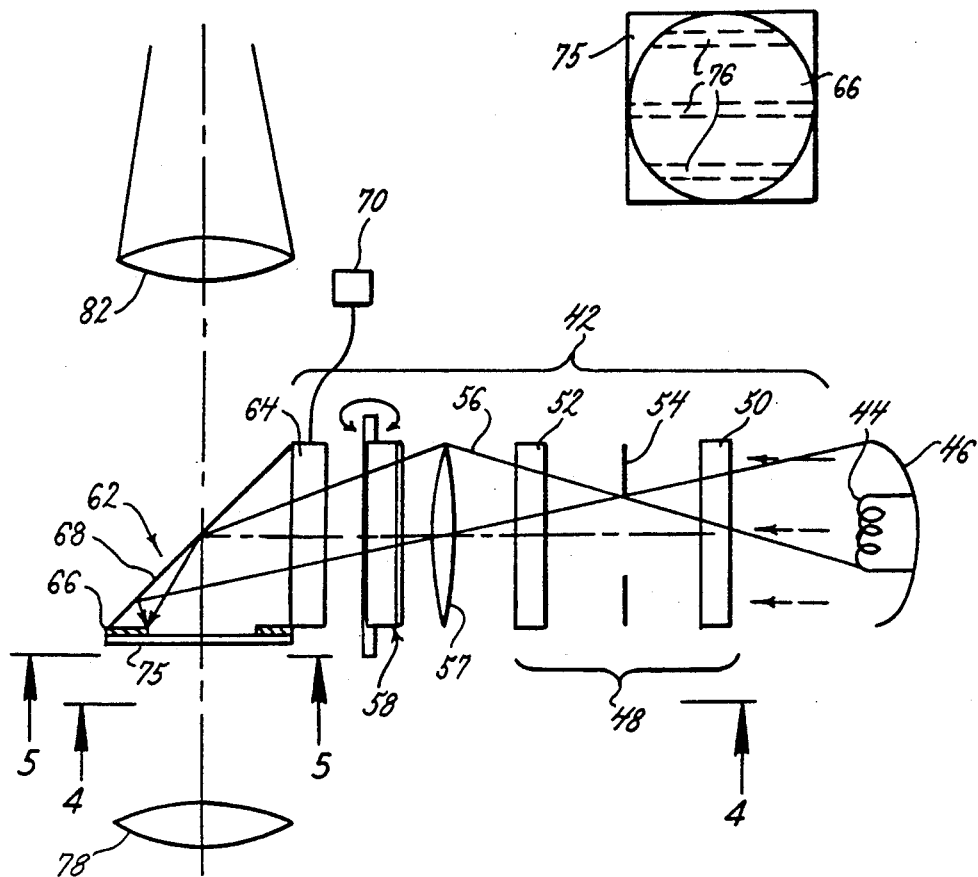
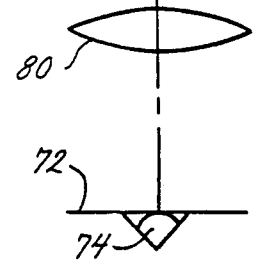
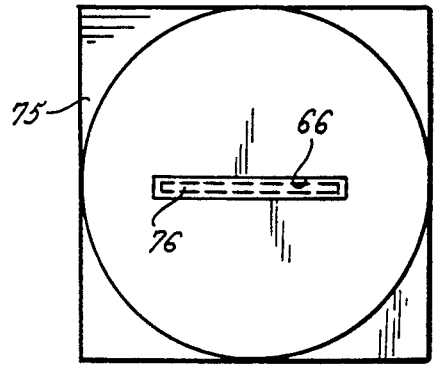
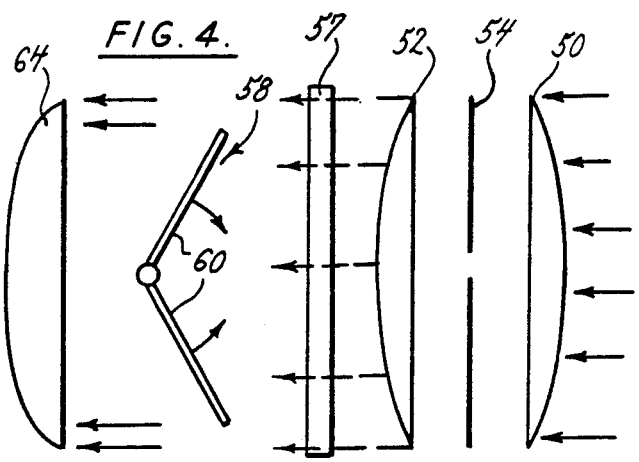

SINGLE APERTURE CONFOCAL SCANNING BIOMICROSCOPE AND KIT FOR CONVERTING SINGLE LAMP BIOMICROSCOPE THERETO

This application is a continuation-in-part of application Ser. No. 07/243,353 filed Sept. 14, 1988, now U.S. Pat. No. 4,884,880 to issue Dec. 5, 1989; and application Ser. No. 07/243,354 filed Sept. 14, 1988, now U.S. Pat. No. 4,884,881 to issue Dec. 5, 1989.

BACKGROUND AND SUMMARY OF THE INVENTION

The slit lamp biomicroscope, or slit lamp as it is commonly referred to, is a versatile instrument used for examining the eye and ocular adnexae. It consists of a biomicroscope, an illumination source, and a mechanical supporting system which facilitates the positioning of the illumination source at various angles to the eye in order to achieve different kinds of examinations. The biomicroscope is an optical device which presents an enlarged image of the patient's eye to the observer and may be either a simple or compound biomicroscope with the latter having the advantages of additional magnification and less aberration than in a single lens system. Most typical prior art compound biomicroscopes present a real and inverted image, which can be corrected using a prism correction system. All slit lamp biomicroscopes achieve stereopsis by having a conversion angle between the separated oculars. However, there are many optical systems used to change magnification. These include rotating objectives, those that operate based on a Galilean telescope principle and those that function with zoom optics.

In examining the structures of the anterior segment of the eye, there are four different techniques that are presently employed with the prior art slit lamp biomicroscope. The first and most common of these is that of direct illumination. This technique involves focusing a beam of light through relatively transparent media and observing the scatter of light against a dark background. There are several forms of scatter illumination which are helpful in selected aspects of the ophthalmic examination. Thus, it is useful for this type of examination to observe scatter illumination in various parts of the eye.

A second technique of slit lamp examination is retro-illumination. With this method, light is reflected off of a diffusing surface to illuminate a more anterior structure in the eye. Thus, light may be bounced off the iris to illuminate the cornea or be reflected off of the fundus to examine the iris or lens. The image from this technique, as well as the technique of direct illumination, is degraded by reflections and by scatter from objects anterior from or posterior to the plane of interest.

A third technique in eye examination is sclerotic scatter. In this method, the incident slit light beam is oriented in an oblique fashion to the eye so that light falls on the limbal area of the cornea. As the angle of incidence is greater than the critical angle, light is reflected internally along the cornea similar to light traveling in fiber optic tubing. Additionally, some retro-illumination also occurs due to light scattered onto the iris or other posterior structures. While this technique is intended to visualize scars or opacities within the corneal stroma, the intense amount of scatter experienced reduces the resolution of the image and, hence, the value of this technique.

A fourth technique for anterior segment examination is that of specular reflection. This method utilizes the difference in index of refraction between the cornea and aqueous humor or the corneatear film and air, allowing visualization of either the corneal endothelium, or epithelium respectively. Occasionally, the anterior and posterior surface of the lens and the zones of discontinuity within the lens can be appreciated. Specular reflection is observed only monocularly, because the illumination beam blocks one of the observation paths. The image created with this technique of examination is degraded due to reflections from other portions of the corneal endothelium or epithelium or other ocular structures. In all four of these techniques of examination, the ocular images are also limited by the available contrast between the subject of interest and surrounding tissue. In addition, the closer the index of refraction is between the two interfaces the less the specular reflection will be, thereby reducing the amount of returning light forming the image to be observed.

While there are accessory devices available in the prior art designed to improve the aforementioned techniques of eye examination with the slit lamp biomicroscope, light reflection and scatter degrade those techniques utilizing direct illumination while limited tissue contrast and low levels of returning light limit the resolution of those techniques utilizing indirect illumination. Also, there is at least one tandem scanning confocal biomicroscope in the prior art which utilizes separate apertures and light paths to achieve some improvement over the typical slit lamp. However, difficulties of complexity and alignment are expected to limit its usefulness, as with tandem scanning confocal microscopes.

To solve these and other problems with the prior art slit lamp biomicroscope, the inventors herein have succeeded in designing and developing a single aperture confocal scanning biomicroscope, as well as two variations of a kit for converting existing slit lamp biomicroscopes into single aperture confocal scanning biomicroscopes. The many advantages of single aperture confocal scanning microscopy over dual aperture confocal microscopy are explained in the parent patents. Confocal microscopy includes the technique of illuminating only a small portion of the specimen at a time, and masking the returning (reflected or fluorescence) light to view only that same small portion to minimize the effects of scattered and out of focus light from surrounding portions of the specimen. The entire specimen is viewed by scanning it in small increments and coalescing these increments either in real time or with a video camera and image processor or the like. Other advantages of single aperture confocal scanning microscopy are to be found in the parent patents referred to, supra. With this invention, the many advantages of single aperture confocal scanning microscopy are brought to the instrument used to examine the eye and thereby minimize the major problems with the prior art slit lamp.

In one of the preferred embodiments, a significant part of the invention includes an improved illumination system. In the improved illumination system, a set of three cylindrical lenses is used to converge the light along the width of the masking aperture and an additional cylindrical lens positioned orthogonally to the first set is used to independently converge the light along the length of the masking aperture. Incorporated in the illumination system is a single assembly comprised of a cylindrical lens, masking aperture, and beam splitter which is oscillated as an integral unit which provides major advantages over other single aperture confocal scanning optical devices. Essentially, the illumination system includes a light filament and a curved reflector for concentrating a large portion of the light emanating from the filament into a pair of lenses with an aperture positioned therebetween in order to collimate the light into an incident light field. The collimating aperture is preferably a rectangular slit with cylindrical lenses, although a pin hole aperture and spherical lenses can be used. With a rectangular slit, the generally rectangular filament should be aligned with its long axis parallel to the slit's long axis. This lens pair and aperture thus aid in producing an incident light field of highly collimated light along the width of the masking aperture utilizing a large portion of the incident light produced by the filament. A cylindrical lens between the lens pair and aperture assembly focuses the incident light field along the length of the masking aperture into a field plane thereat.

The assembly mentioned above (aperture assembly), including a lens, a masking aperture, and a beam splitter, is positioned within the light field beyond the last mentioned cylindrical lens and further focuses the incident light field along the width of the masking aperture into an aperture size beam at the masking aperture. Additionally, a pivotally mounted variable V-shaped flap may be used to block a variable central portion of the light field so as to create an aperture size incident light beam comprised essentially of the edge portions of the light field. By doing so, only that light entering the lens at a relatively oblique angle is utilized which can optimally minimize the volume of intersection between the incident light and the return light path. Not only does this achieve dark field illumination of the specimen but it also minimizes scattering within all planes in the return light path with the exception of the specimen plane. This latter feature which is achieved with this "peripheral illumination" helps to maximize optical sectioning.

The particular lens used in the aperture assembly is a cylindrical lens which focuses the light along its width through the masking slit aperture. By matching the lens with the masking aperture, the aperture size beam may actually be focused within the contour of the masking aperture such that there is no backscatter from the aperture and virtually all of the incident beam passes therethrough. This further concentrates the incident light beam and provides a marked improvement to contrast as backscatter from the aperture is eliminated as a component of the light returning to the viewer. The pivotally mounted flap or peripheral illuminator may be included as part of the assembly which is oscillated within the conjugate field plane, if desired. All of the foregoing including the incident light source, lens pair and collimating aperture, cylindrical lens focusing along the length of the masking aperture, pivotally mounted flap, and aperture assembly of lens, masking aperture, and beam splitter, all comprise the illumination system which may be used to replace the slit lamp illumination system in the prior art.

Another pair of lenses then focuses the incident light beam at the specimen plane. Light reflected from the specimen is similarly focused by the same lens pair at the masking aperture and is masked thereby. Thus, light returning from the specimen is masked by the masking aperture in the preferred embodiment, but not the light illuminating the specimen. The returning light passes through the beam splitter to a biomicroscope objective as is well known in the art and the observer is thus presented with a confocal image of the eye which is illuminated either with direct illumination or with peripheral illumination. As is well known in the art, a pair of erector prisms may be used anywhere in the return light to re-orient the image in the upright direction, and hence are not shown.

The single aperture confocal scanning biomicroscope of this invention may be provided as a complete device, or the illumination system and lens pair may be provided as a retrofit kit to adapt existing slit lamp biomicroscopes for use as a single aperture confocal scanning biomicroscope.

In still another alternative, the lens used as part of the aperture assembly may be a double compound cylindrical lens; or may be a pair of cylindrical lenses bonded together, or may be a spherical lens in the event the cylindrical lens focusing along the length of the masking aperture is eliminated; or the lens may focus the light only along its width for some applications.

A somewhat simpler embodiment is also disclosed herein comprised of an aperture, an aperture oscillator, and a pair of lenses, with an alternative of a third lens or prism assembly for reinverting the image. In this embodiment, the original illumination system of a prior art slit lamp biomicroscope is utilized except that the masking aperture is placed at the original specimen plane, and the pair of lenses are used to refocus the incident light at a new specimen plane. Means are provided for moving the masking aperture within the conjugate field plane in which it is placed. In this embodiment, the masking aperture may have a multitude of openings through which the incident light may pass to illuminate the specimen. For example, a rotating Nipkow disc or an oscillating multi-slit aperture could be used. The third lens or erector prisms may be disposed in the returning light path to reinvert the image for viewing by the observer. As this embodiment utilizes the existing illumination system of the slit lamp and thus does not provide peripheral illumination, its performance is not nearly as dramatically improved as with the first embodiment described above. Additionally, in this embodiment, the mirror of the illumination system blocks a portion of the return light from the image causing resolution to suffer. Replacing the mirror with a beam splitter would prevent this blockage, but this is generally inconvenient in most biomicroscopes of prior art design.

While the principal advantages and features of the present invention have been explained above, a greater understanding of the invention may be attained by referring to the drawings and description of the preferred embodiment which follow.

BRIEF DESCRIPTION OF THE DRAWINGS

FIG. 3 is a schematic representation of a single aperture confocal scanning biomicroscope utilizing a replacement illumination system;

FIG. 4 is a partial cross-sectional view taken along the plane of line 4—4 in FIG. 3 and detailing the masking aperture, peripheral illuminator, and collimating arrangement; and FIG. 5 is a view taken along the plane of line 5—5 in FIG. 3 and detailing the circular illumination limiter adjacent the masking aperture.

DETAILED DESCRIPTION OF THE PREFERRED EMBODIMENT

Figure 1:
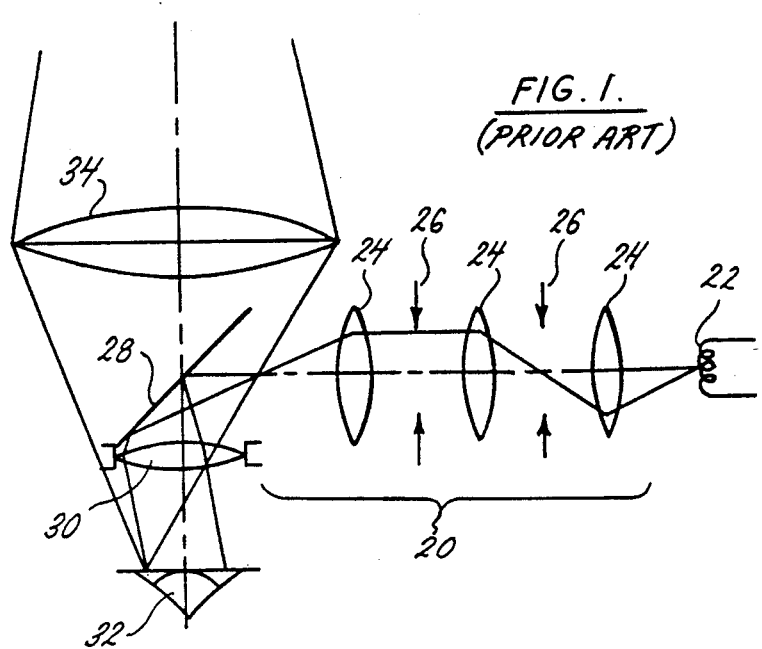
FIG. 1 is a schematic representation of a typical prior art slit lamp biomicroscope.

As shown in FIG. 1, a typical slit lamp biomicroscope of the prior art includes an illumination system 20 comprised of a light filament 22, three lenses 24 and a pair of apertures 26 for adjusting the incident light, a mirror 28 which is substantially narrow and rectangular for directing the light through an objective lens 30 onto a patient's eye 32. Returning light passes around the rectangular mirror 28 and into the viewing optics 34 for viewing the image of the eye 32. The illumination system 20 is generally mounted on a traverse rod or the like so that it can be oriented at various angles to the patient's eye 32 in order to provide for either direct illumination of the eye 32 or indirect illumination of the eye as is explained in the background of the invention, supra.

Figure 2:
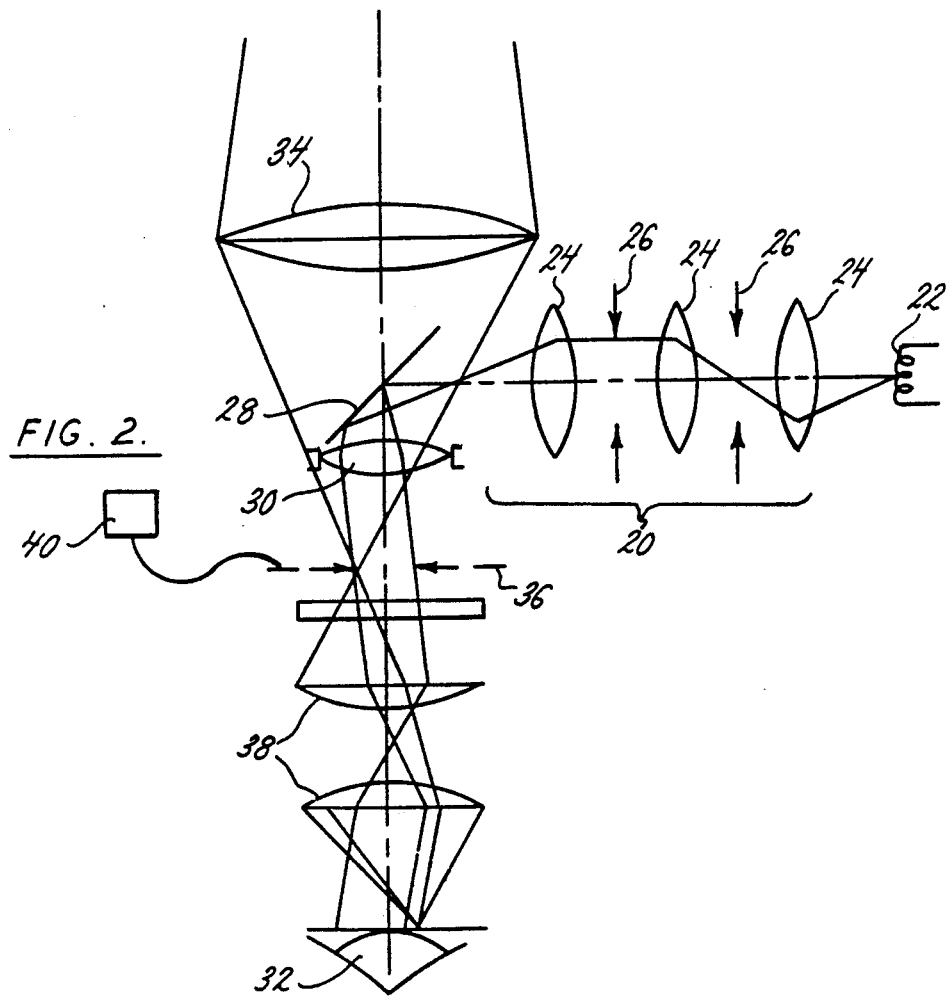
FIG. 2 is a schematic representation of a prior art slit lamp biomicroscope modified for single aperture confocal scanning without replacing the existing illumination system.

As shown in FIG. 2, the simplest way to convert the prior art slit lamp biomicroscope of the prior art as shown in FIG. 1 for single aperture confocal scanning is by the simple addition of several lenses, an aperture, and an aperture oscillation device. As shown therein, the same illumination system 20 is utilized comprised of the filament 22, lenses 24, apertures 26, mirror 28, and objective lens 30. However, an aperture 36 is positioned at the focal plane whereat the eye 32 was previously located and a pair of lenses 38 are used to focus the incident light into a new specimen plane whereat the eye 32 is repositioned and the returning light at a field plane coincident with the aperture. An aperture oscillation or rotation device 40, as is well known in the art, moves the aperture 36 to scan the eye 32 with light from the illumination system 20, with both incident and reflected light traversing the same aperture 36 to thereby produce a confocal image of the eye 32. The same viewing optics 34 are used to observe the image. The lenses 38 and aperture 36 may be mounted in a fixed position relative to the patient, in which event a limited amount of lateral movement of the illumination system 20 may be permitted for a limited examination with indirect illumination. Therefore, eye examination techniques utilizing indirect illumination may be performed with this arrangement. However, backscatter of light from aperture 36 limits contrast and would have to be corrected with polarizers.

Another embodiment is depicted in FIGS. 3-5 and includes a completely new illumination system 42. The illumination system 42 is comprised of a light filament 44 partially surrounded by a curved reflector 46 which shines a field of incident light into a light collimating arrangement 48. The light collimating arrangement 48 includes a pair of lenses 50, 52 separated by an aperture 54, with lens 50 focusing the incident light through the aperture 54 and lens 52 defocusing the light into a collimated incident light field of parallel light 56. As shown in FIGS. 3 and 4, lenses 50, 52 are cylindrical lenses and aperture 54 is a rectangular slit. With this arrangement, incident light is collimated along the width of collimating aperture 54. However, in an alternative embodiment, lenses 50, 52 may be spherical lenses and aperture 54 may be a pin hole instead of a rectangular slit. With this arrangement, incident light is highly collimated along both the width and length of masking aperture 66.

Cylindrical lens 57 focuses the collimated light field 56 along the length of masking aperture 66.

A peripheral illuminator 58 is generally comprised of a pivotally mounted variable V-shaped flap 60 which can be used to block a variable central portion of the collimated light field 56. This would provide for peripheral illumination, as is explained above. An aperture assembly 62 is generally comprised of a cylindrical lens 64 and a rectangular slit aperture 66 joined at their edges with a beam splitter 68 completing the triangle. The aperture assembly 62 may be oscillated within the plane of the aperture 66 by an oscillator 70, as is well known in the art. Additionally, peripheral illuminator 58 may be physically secured to aperture assembly 62, or not, depending upon the particular application. Cylindrical lens 64 serves to focus the light field 56 along its width and thereby produce a generally rectangular incident aperture beam which closely approximates the contour of masking aperture 66, but remains within its contour to thereby pass therethrough without masking thereby. Cylindrical lenses 57 and 64 focus the light field 56 at a field plane coincident with masking aperture 66 which is conjugate to the specimen plane 72 whereat the eye 74 is positioned. A circular illumination limiter 75 is mounted adjacent masking aperture 66 and is used to restrict the illumination to a circular field. As shown in FIG. 4, the aperture size beam 76 fits within the rectangular slit aperture 66. A pair of lenses 78, 80 focus the incident light at the specimen plane 72 whereat the eye 74 is positioned and returning light at a field plane coincident with the aperture such that the aperture size beam illuminates only an aperture shaped portion of the eye. As shown in FIG. 5, the circular illumination limiter 75 remains fixed as the aperture assembly 62 moves to scan the specimen 74. FIG. 5 depicts the masking achieved by limiter 75 at three different positions of the oscillating aperture assembly 62. In order to examine different portions of the eye, all of the components of the single aperture confocal scanning biomicroscope may be moved about the eye while a patient rests his chin in a fixture, as is well known in the art. The specimen plane 72 is beyond the standard specimen plane of the standard biomicroscope.

As is evident from the foregoing, with the present invention as shown in FIGS. 3—5, an existing slit lamp biomicroscope may be modified by providing a new illumination system 42 as well as one or both of lenses 78, 80 in order to convert it to a single aperture confocal scanning biomicroscope. Alternately, completely new single aperture confocal scanning biomicroscopes may be provided using the features of the present invention.

There are various changes and modifications which may be made to the invention as would be apparent to those skilled in the art. However, these changes or modifications are included in the teaching of the disclosure, and it is intended that the invention be limited only by the scope of the claims appended hereto.

What is claimed is:

1. In a device having means for producing a confocal image of a desired object positioned at an object plane, the improvement comprising a light source having means for producing non-collimated light, means for collimating a substantial portion of the light from said light source in at least one orientation into a light field, and means for focusing a substantial portion of said collimated light field into an aperture shaped beam at a field plane conjugate to the object plane so that as the focusing means is moved the aperture shaped beam confocally scans the object.

2. The device of claim 1 wherein the collimating means includes a pair of lenses and a collimating aperture positioned between said lenses so that one of said lenses focuses the incident light into the collimating aperture and the other of said lenses de-focuses the light emerging from the collimating aperture into the light field.

3. The device of claim 2 wherein the collimating aperture is approximately in the shape of a rectangular slit and the lens pair are two cylindrical lenses.

4. The device of claim 2 wherein the collimating aperture is approximately in the shape of a pin hole and the lens pair are two spherical lenses.

5. The device of claim 2 further comprising a masking aperture in the returning light path and wherein the focusing means includes means for focusing the aperture shaped beam at the masking aperture so that substantially all of the aperture shaped beam passes therethrough.

6. The device of claim 5 wherein the masking aperture and the aperture shaped beam are substantially in the shape of a rectangle, and the focusing means includes means for focusing the collimated light field along both the width and length of the rectangle.

7. The device of claim 6 wherein the focusing means includes at least two orthogonally oriented cylindrical lenses.

8. The device of claim 5 further comprising means for maintaining register between said masking aperture and the aperture shaped beam as the aperture shaped beam scans the object.

9. The device of claim 8 wherein said register means comprises a mechanical connection between said masking aperture and the focusing means.

10. The device of claim 9 further comprising means for selectively blocking a portion of said light field from said focusing means.

11. The device of claim 9 wherein the blocking means includes means for varying the amount of said light field portion blocked thereby.

12. The device of claim 11 wherein the blocking means comprises a flap pivotally mounted in the light field.

13. The device of claim 12 wherein the flap is mounted in substantially the center of the light field so that all but the edge portions of the light field may be blocked from the focusing means, and further comprising means for maintaining register with at least a portion of the focusing means as the focusing means is moved to scan the object with the aperture shaped beam.

14. A confocal, scanning, biomicroscope for examining a human eye, said biomicroscope having both an incident light path and a returning light path, means for producing a single field plane conjugate to the eye under examination in both the incident and the returning light paths, and a single aperture positioned at said conjugate field plane, said aperture having means for masking at least the returning light to thereby produce a confocal image of the human eye.

15. The biomicroscope of claim 14 wherein the field plane producing means includes means for focusing at least a portion of the incident light into an aperture shaped beam substantially the same shape as the aperture.

16. The biomicroscope of claim 15 further comprising means for processing the incident light for peripheral illumination of the eye.

17. The biomicroscope of claim 16 wherein the peripheral illumination means comprises means for blocking at least a portion of the focusing means from the incident light except that portion thereof which illuminates its edges.

18. The biomicroscope of claim 17 wherein the blocking means comprises a pivotally mounted flap.

19. The biomicroscope of claim 16 further comprising means for maintaining alignment between the focusing means, peripheral illumination means, and aperture as they are moved to thereby scan the eye with the aperture shaped beam.

20. The biomicroscope of claim 19 wherein the aperture is in the approximate shape of a rectangular slit and the focusing means comprises a cylindrical lens.

21. The biomicroscope of claim 19 wherein the focusing means has means for focusing incident light through both the height and width of the aperture.

22. The biomicroscope of claim 14 further comprising an incident light source having means for producing noncollimated light, means for collimating a substantial portion of the light from said light source in at least one orientation into a light field, and means for focusing a substantial portion of said collimated light field into an aperture shaped beam at the conjugate field plane so that as the focusing means is moved the aperture shaped beam confocally scans the eye.

23. The biomicroscope of claim 22 wherein the collimating means includes a pair of lenses and a collimating aperture positioned between said lenses so that one of said lenses focuses the incident light into the collimating aperture and the other of said lenses de-focuses the light emerging from the collimating aperture into the light field.

24. The biomicroscope of claim 23 wherein the collimating aperture is approximately in the shape of a rectangular slit and the lens pair are two cylindrical lenses.

25. A confocal, scanning biomicroscope having means for producing an image of a desired portion of a specimen, and means for generating an incident light beam capable of peripheral illumination of the specimen.

26. The biomicroscope of claim 25 wherein the incident light beam generating means includes a light source, and the peripheral illumination means includes means for blocking the central portion of said incident light source.

27. The biomicroscope of claim 26 further comprising means for varying the proportion of the incident light source which is blocked.

28. The biomicroscope of claim 27 wherein the blocking means comprises a pivotally mounted flap.

29. In a confocal, scanning optical device, the improvement comprising an incident light source having means for generating a ray-annular shaped peripheral illumination incident light beam.

30. The device of claim 29 wherein the non-annular shaped peripheral illumination means includes means for blocking the central portion of the incident light source.

31. The device of claim 30 further comprising means for varying the proportion of the incident light-source which is blocked.

32. In a single aperture, confocal, scanning optical device having means for producing a confocal image of a desired object positioned at an object plane, the device having means for focusing the incident light and the reflected light at a field plane conjugate to the object plane, the single aperture being positioned at said conjugate field plane, the improvement comprising the focusing means having means for focusing substantially all of said incident light beam inside the edge of said aperture so that said incident light beam passes therethrough with minimal masking by said aperture.

33. The device of claim 32 wherein said focusing means includes means for focusing said incident light beam into substantially the same shape but slightly smaller than the aperture as it passes therethrough.

34. The device of claim 33 wherein the shape of the aperture and the incident light beam is substantially that of a rectangular slit, and the focusing means includes means for focusing the incident light along both the width and height of the single aperture.

35. The device of claim 34 wherein the focusing means includes at least a pair of orthogonally oriented cylindrical lenses.

36. The device of claim 32 further comprising means for producing an incident light field of substantially collimated light, and means for moving at least a portion of said focusing means within said light field to thereby scan the object with incident light.

37. In a single aperture confocal scanning optical device having means for producing a confocal image of a desired object positioned at an object plane, the single aperture being positioned at a field plane conjugate to the object plane in at least the return light path, the improvement comprising means for focusing an incident light beam into substantially the same contour as the aperture at the object plane without masking by an aperture with an equivalent contour.

38. The device of claim 37 further comprising means for producing a light field of collimated light and means for moving at least a portion of said focusing means within said light field to thereby scan the object with the incident light beam.

39. The device of claim 38 further comprising means for coordinating the movement of said focusing means portion and the aperture as said object is scanned.

40. The device of claim 39 further comprising means for converting said light beam into a peripheral illumination beam.

41. The device of claim 32 wherein said focusing means focuses the incident light beam through the aperture.

42. In a single aperture confocal scanning optical device, the device having a light source for producing collimated light, an incident light path, and a return light path, the improvement comprising an assembly positioned in both the incident light path and the return light path, said assembly having means for focusing the collimated light into a beam which may pass through an aperture, said assembly including the aperture positioned at least in the return light path for masking the return light, and means for moving said assembly within the collimated light to thereby scan the object and create a confocal image thereof.

43. The device of claim 42 wherein the assembly further comprises a beam splitter extending between the focusing means and the aperture.

44. The device of claim 42 wherein the assembly further comprises means for partially blocking the incident light path to thereby restrict the composition of the incident light beam.

45. The device of claim 44 wherein the blocking means includes means for selectively blocking a variable central portion of the incident light path to thereby restrict the composition of the light beam to edge lighting.

46. The device of claim 42 wherein the focusing means includes means for focusing the beam into substantially the same contour as that of the aperture.

47. In a biomicroscope having means for producing a confocal image of an object positioned at an object plane, the biomicroscope including means for focusing the incident light along an incident light path and means for focusing the light returning rom the object along a return light path, the improvement comprising means for substantially eliminating any intersection between the incident light and the return light, except at the object plane.

48. The biomicroscope of claim 47 wherein the light intersection eliminating means comprises a peripheral illuminator positioned in the incident light path.

49. The biomicroscope of claim 48 further comprising means to adjust the peripheral illuminator to thereby adjust the intersection of light to a minimum.

* * * * *